United States Patent [19]

Nelson

[11] Patent Number: 5,287,580

[45] Date of Patent: Feb. 22, 1994

[54] FOLDING PORTABLE RAMP

[76] Inventor: Steven H. Nelson, 4 Knightsbridge Rd., Apt. 406, Brampton, Ontario L6T 5L5, Canada

[21] Appl. No.: 810,861

[22] Filed: Dec. 20, 1991

[30] Foreign Application Priority Data

Dec. 21, 1990 [CA] Canada ................. 2032918

[51] Int. Cl.⁵ .................................. E01D 1/00
[52] U.S. Cl. ............................. 14/71.3; 414/537
[58] Field of Search ............... 14/69.5, 71.1, 71.3; 404/35; 414/537; 294/151, 167

[56] References Cited

U.S. PATENT DOCUMENTS

| | | | |
|---|---|---|---|
| 1,771,203 | 7/1930 | Bench | 254/88 |
| 2,141,529 | 12/1938 | Gravelle | 14/69.5 |
| 2,449,829 | 9/1948 | Agren | 14/69.5 |
| 2,779,958 | 2/1957 | Hodges et al. | 14/69.5 |
| 3,491,394 | 1/1970 | Le Clear | 14/69.5 |
| 3,517,791 | 6/1970 | Miles | 14/69.5 X |
| 3,820,912 | 6/1974 | Hughes | 14/69.5 X |
| 3,984,891 | 10/1976 | Weinmann | 14/69.5 |
| 4,528,711 | 7/1985 | Packer | 14/69.5 X |
| 4,726,516 | 2/1988 | Cree | 238/10 |
| 4,853,999 | 8/1989 | Smith | 14/69.5 |
| 4,864,672 | 9/1989 | Altieri et al. | 74/69.5 |
| 4,874,284 | 10/1989 | New, Jr. | 414/537 |
| 5,010,614 | 4/1991 | Braemert et al. | 14/71.1 |
| 5,170,976 | 12/1992 | Lundman | 14/69.5 X |

*Primary Examiner*—Kenneth J. Dorner
*Assistant Examiner*—Nancy P. Connoly
*Attorney, Agent, or Firm*—Donald E. Hewson

[57] ABSTRACT

A lightweight folding portable ramp for use with an electric scooter or a wheelchair which may be positioned by the user without dismounting from the means of conveyance. The ramp is comprised of two ramp members and may include a rectangular connecting means, all of which are hinged together. Handles for lifting are provided on the ramp members.

18 Claims, 3 Drawing Sheets

FOLDING PORTABLE RAMP

This invention relates to loading ramps and more particularly to folding portable ramps.

Portable folding ramps in the past have been adaptable to a relatively broad range of spans and rises. Because of this adaptability they have been relatively complex and expensive to manufacture, heavier, and less portable.

U.S. Pat. No. 3,984,891 issued to C. E. Weinman on Oct. 12, 1976 shows a portable ramp having a main section with a pair of pivotally attached end portions so that the ramp can accommodate different height differentials while minimizing the bump that would be experienced getting on and off the ramp. The cross-wise folds in this ramp as well as the cumbersome end portions do little to enhance portability.

U.S. Pat. No. 4,726,516 issued to I. C. Cree on Feb. 23, 1988 shows a foldable ramp having a pair of telescoping tracks with pivotally attached upper end sections. Lifting means which elevate the front of the ramp are provided. Again, this portable ramp is relatively complex and consequently less portable.

U.S. Pat., No. 4,528,711 issued to L. Packer on Jul. 16, 1985 is a portable ramp for a wheelchair. It has a pair of telescoping ramp sections, which are releasably secured to spacer brackets. Again, while this ramp has the capacity to span the length and rise of about four steps, it requires assembly before and after use, and a disabled user would not be able to use it alone.

Another problem with Weinman, Cree and Packer's inventions is their difficulty to manufacture and accompanying expense. While these designs may be efficient in surmounting a large rise, they are excessive in weight, size and cost for overcoming the most common obstacle an impaired individual encounters. There is a real need for a ramp which impaired users may utilize by themselves to get over a curb.

The requirements of such a ramp are primarily its portability and ease of use. An impaired person wants a light ramp which is easily carried and a ramp which a user alone may use without dismounting from his means of transport.

The present invention provides a lightweight, easily transportable ramp which may be handled by a disabled person. It can be quickly placed in position, used, retrieved, and then refolded.

According to one aspect of the invention, there is provided a lightweight portable ramp comprising two rigid rectangular planar ramp members each having a length for traversing substantially greater than its width, and hinging means for connecting one of the long sides of each of said ramp members to an adjacent long side of the other ramp member. In use, the said ramp members are pivoted outwardly until they both lie in the same plane.

According to another aspect of the invention, there is provided a portable folding ramp with a rectangular connecting means having two opposite sides extending in the direction of travel over the ramp. Two rigid rectangular planar ramp members, each having a length for traversing substantially greater than its width, are hinged by means connecting one of the long sides of each said ramp member to a respective one of said opposite sides of the connecting means. In use, the ramp members are pivoted outwardly to a position in the same plane as said connecting means, which separates the two ramp members an appropriate distance so that they can be traversed in their lengthwise direction. A preferred embodiment of the invention provides a means of lifting the ramp which is a rope.

The invention is illustrated in particular and in a preferred embodiment in which.

Figure 1:
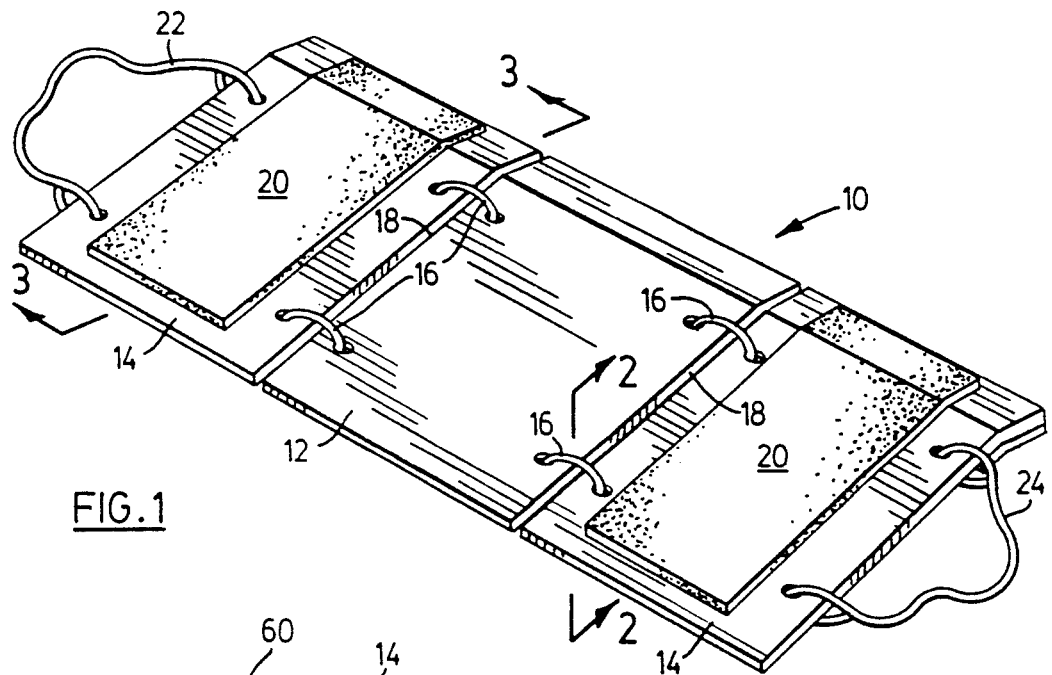
FIG. 1 is a plan view of a three-section folding portable ramp.

A folding portable ramp 10 is shown in an open position in FIG. 1. A rectangular connecting means 12 is hinged by rings 16 through holes along opposite sides 18, to ramp members 14. The two ramp members 14 each have tops with a frictional surface 20 thereon. If the ramp is to be used by delivery personnel in conjunction with hand trucks or dollies then it might be preferable to emboss the top surface rather than providing a frictional surface thereon. The frictional surface is a one sided abrasive cloth which is adhered to the top surface of the ramp) members. The frictional surface may be acquired with an adhesive backing. The frictional surface may be additionally mounted on top of the connecting means if a three-wheeled vehicle will be using the ramp. The frictional surface is set back from the ends of the length and the opposite sides defining the width of the ramp in order to prevent fraying. It is recommended that the frictional surface have a high colour contrast in order to facilitate checking the proper alignment of the load on the ramp. Lifting means, preferably in the form of ropes 22, 24 are connected to the unhinged long side of the ramp members 14.

Figure 2:
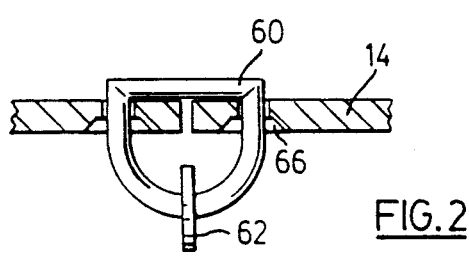
FIG. 2 is an enlarged partial cross-section of FIG. 1 showing a preferred hinging mans.

FIG. 2 is an enlarged partial cross-section of FIG. 1 showing a preferred hinging means. A D-ring 60 is shown having a flat washer 62 welded thereon to facilitate maintaining a flat upper surface for the ramp. The hinging means should allow for a slight shifting of a single section due to movement of unstable objects under the ramp. This slight shifting may occur under load and it is desirable that only one ramp member shift. The hinging means should further allow the ramp to accommodate minor elevation irregularities such as those caused by cracks, frost heaving and the like. The ramp member 14 has a bottom side with a chamfer 66 to promote even wear around the curved D-ring 60.

Figure 3:
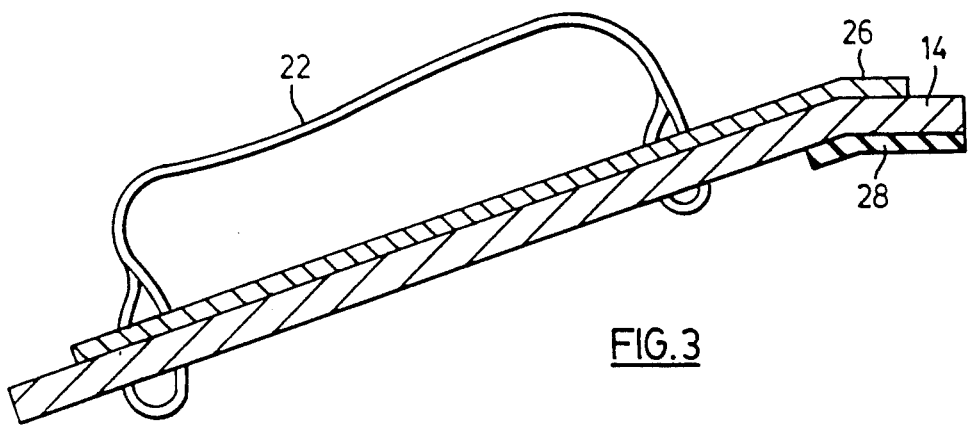
FIG. 3 is a cross-sectional view of a ramp member.

A cross-section of ramp member 14 is shown in FIG. 3. An upper end of the ramp member is bent in order to better fit on a curb. The bend might be 25° for a 6¼" rise and a ramp member which is 15" long. The bend at the upper elevation serves the following functions: a) it prevents the ramp from shifting position as a load crosses over; b) it increases the contact area under the bend; and c) minimizes rolling resistance. The cross-section shows the frictional surface 26 on a top side of the side section 14 and the rubber gripping surface 28 thereunder. The rubber gripping surface should be made of a soft rubber. It should be applied from the leading edge to ⅛" below the radius of the bend. The gripping surface serves to secure the position of the ramp in the event of one section shifting due to objects under the ramp.

Figure 4:
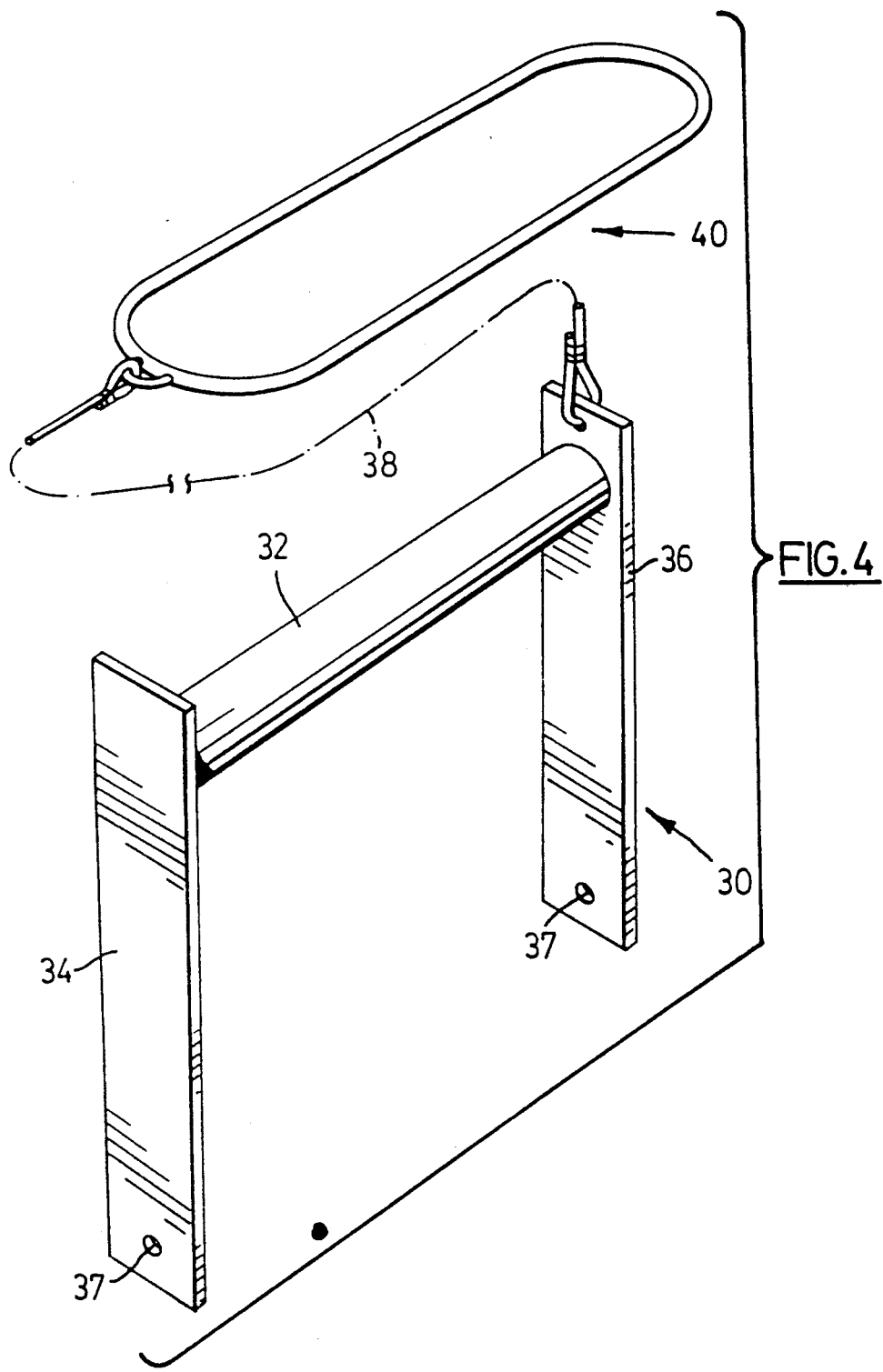
FIG. 4 is a perspective view of a ramp handle and a retention handle.

FIG. 4 is a perspective view of an optional ramp handle 32 and an optional retention handle 40. A dowel 32 having ends affixed to flat bars 34, 36 provides a handle which is easily grasped. Flat bars are used to allow the ramp handle to be stepped on in order to further facilitate grasping it. The flat bars 34, 36 are provided with circular openings 37 through which ropes may be connected to a ramp member. One flat bar 36 has a circular opening in its dowel end in order to provide a place to optionally attache a rope 38, having an opposite end connected to a retention handle 40. The retention handle 40 has an ovular shape in order to facilitate retention by a user with impaired grasping. Such a retention handle 40 would facilitate securing the ramp handle 32 from a seated position. The rope 38 would be required to be of sufficient length in order that the user could place the ramp while retaining the retention handle 40, travel over the ramp and then collect his ramp via the retention handle. In use the retention handle would be held after the lifting handles of the ramp were released when the ramp was correctly positioned. The position of rope attachment to the ramp) allows it to be tilted for more accurate positioning.

The folding portable ramp preferably has rectangular connecting means and ramp members which are of equal length. Also, because the ramp members bear weight, they most preferably should be thicker or made from a stronger material than the connecting means. However, the connecting means must be sufficiently strong to be able to support the weight of a person who might push a wheelchair. The preferred material is aluminum or better yet, an aluminum alloy which is both strong and lightweight.

However, any material sufficiently strong and light would be effective. An aluminum sheet of 3/16" thickness was found to provide adequate strength for ramp members having a length of 15" supporting a user in a wheelchair or electric scooter. Ramp members made of other materials, such as plastic, would have varying thickness to support the same weight.

A hinging means may include a rope or more preferably, rings mounted through holes in the connecting means and ramp member. A lifting means may include any functional device such as a strap. In the most common embodiment, the lifting means is a rope. The rope may be provided with handles and length adjustment. Ropes used for lifting on each ramp member should be of the same length. The ropes may be provided with a quick release feature, such as that sold under the trade mark "Velcro". If a "Velcro" fastener was used, it would be positioned on the ropes in order to hold the ropes rolled around the folded ramp. The ropes might also be provided with hooks having a releasable latch in order to detachably retain them in the holes in the ramp.

The overall dimensions of the unfolded ramp are approximately 28" wide×15" long; however, large variances in these dimensions are possible in different applications. A person with less control over a wheelchair might want a wider ramp for safety reasons.

The underside of the ramp) members which are bent to fit on a curb is the preferred area to provide a rubber gripping surface. To allow for lengthwise shifting of the ramp) the rubber gripping surface is additionally extended somewhat beyond the curb contact area. It is also advantageous to provide a gripping surface under the connecting means. The rubber gripping surface would be made of a soft rubber. The rubber could be adhered to the ramp members by an adhesive such as contact cement.

Figure 5:
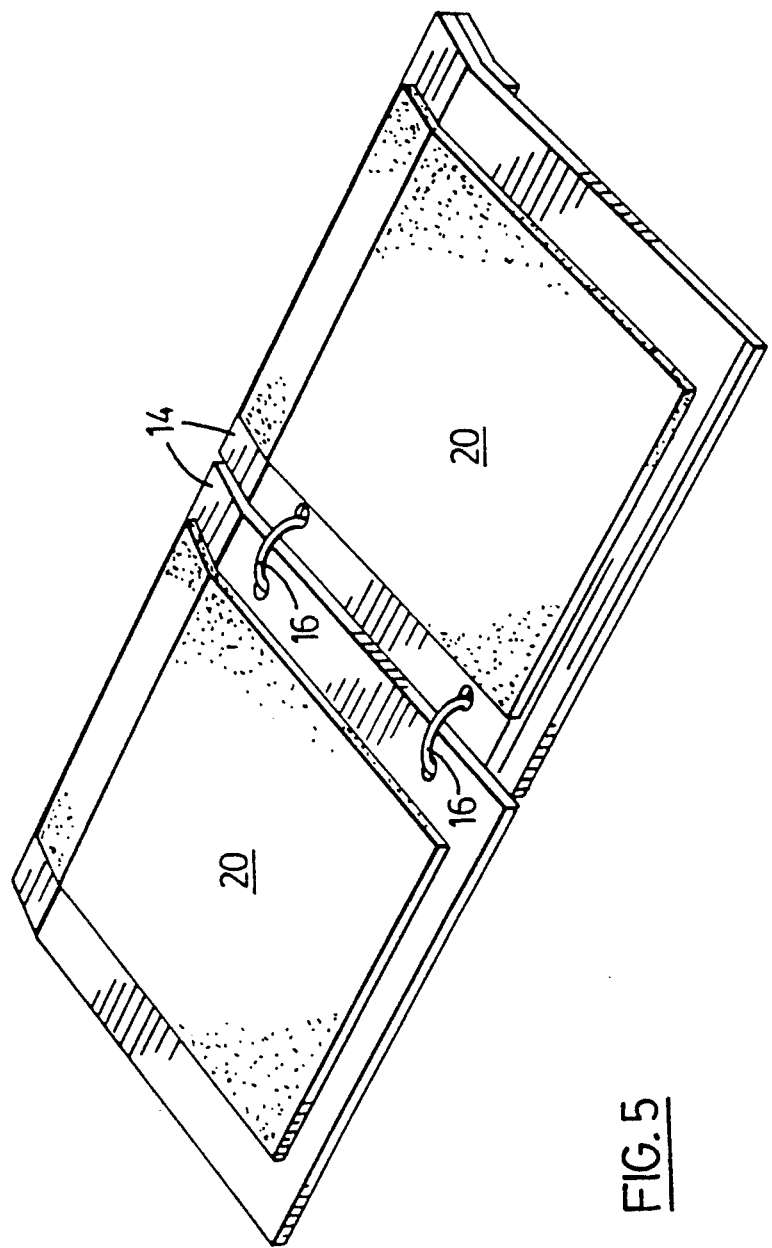
FIG. 5 is a perspective view of a two-section folding portable ramp.

FIG. 5 is a perspective view of a two-section ramp. It is similar in construction to the three-section ramp. However, in the two-section ramp the connecting means is omitted and the ramp members are hinged directly to each other. The ramp members may be dimensioned wider than they were in the three-section ramp.

The embodiments of the invention in which an exclusive property or privilege is claimed are defined as follows:

1. A lightweight portable ramp for use in allowing a wheeled vehicle to traverse between a first upper level and a second lower level, said ramp comprising:
   two rigid planar ramp members having a hinging means therebetween; wherein each rigid planar ramp member has a bent first end adapted for operative engagement with said first upper level and a second end adapted for operative engagement with said second lower level; said ramp members being adapted to supportingly span between said first upper level and said second lower level and being of a small size and low weight so as to be maneuverable in to and out of place by a person using one hand; and
   wherein said hinging means connects said two rigid planar ramp members in side-by-side adjacent relation to each other between said bent first end and said second end, so that said portable ramp may be changed between a transportable position whereat said two ramp members are folded against one another and an in-use position whereat said ramp members are pivoted outwardly so as to be generally co-planar.

2. A ramp as in claim 1 wherein each ramp member has a top side with a frictional surface thereon.

3. A ramp as in claim 2 wherein each ramp member has a bottom side with a rubber gripping surface thereon.

4. A ramp as in claim 3 further comprising separate lifting means attached to each ramp member.

5. A ramp as in claim 4 wherein the lifting means comprises rope means.

6. A ramp as in claim 5 wherein the ropes are provided with handles.

7. A ramp as in claim 6 wherein a retention handle is provided.

8. A ramp as in claim 1, wherein each of said ramp members has a length of between about 10 inches and 24 inches and a width of between about 8 inches and about 16 inches.

9. A lightweight portable ramp for use in allowing a wheeled vehicle to traverse between a first upper level and a second lower level, said ramp comprising:
   two rigid planar ramp members having a hinging means and a connecting means therebetween; wherein each rigid planar ramp member has a bent first end adapted for operative engagement with said first upper level and a second end adapted for operative engagement with said second lower; said ramp members being adapted to supportingly span between said first upper level and said second lower level and being of a small size and low weight so as to be maneuverable in to and out of place by a person using one hand;
   wherein said connecting means has two opposite sides, each of said opposite sides adapted for hinged attachment to one of said two rigid planar ramp members, said connecting means acting as a third member; and wherein said hinging means connected said two rigid planar ramp members in side-by-side adjacent relation to said connecting means, one at each of said two opposite sides, between said bent first end and said second end, so that said portable ramp may be changed between a transportable position whereat said two ramp members and said connecting means are folded against one another and an in-use position whereat said ramp members and said connecting means are pivoted outwardly so as to be generally co-planar.

10. A ramp as in claim 9, wherein each of said ramp members has a length of between about 10 inches and 24 inches and a width of between about 8 inches and about 16 inches.

11. A ramp as in claim 9 wherein each ramp member has a portion on one end which is bent in order to better fit on an elevated surface.

12. A ramp as in claim 11 wherein each ramp member has a top side with a frictional surface thereon.

13. A ramp as in claim 12 wherein each ramp member has a bottom side with a rubber gripping surface thereon.

14. A ramp as in claim 13 further comprising separate lifting means attached to each ramp member.

15. A ramp as in claim 14 wherein the lifting means comprises rope means.

16. A ramp as in claim 15 wherein the ropes are provided with handles.

17. A ramp as in claim 16 wherein a retention handle is provided.

18. A ramp as in claim 13, wherein the connecting means is constructed from a lighter material than the ramp members which are adapted to support a load traversing the ramp.

* * * * *